United States Patent

[11] 3,612,433

[72] Inventor Nelson H. Patton, Jr.
Houston, Tex.
[21] Appl. No. 867,252
[22] Filed Oct. 17, 1969
[45] Patented Oct. 12, 1971
[73] Assignee Electronic Laboratories, Inc.

[54] SWITCHING APPARATUS FOR CASSETTE TAPE-RECORDING EQUIPMENT INCORPORATING AN INTERLOCK SYSTEM
9 Claims, 5 Drawing Figs.

[52] U.S. Cl. .................................................... 242/201
[51] Int. Cl. .................................................... B11b 15/32, G03b 1/04
[50] Field of Search .......................................242/201–210, 197, 198

[56] References Cited
UNITED STATES PATENTS

| | | | |
|---|---|---|---|
| 2,877,958 | 3/1959 | Moore et al. ................. | 242/208 X |
| 3,093,334 | 6/1963 | Andrews ...................... | 242/201 X |
| 3,458,158 | 7/1969 | Ohira ........................... | 242/198 |

*Primary Examiner*—Leonard C. Christian
*Attorney*—Donald Gunn

ABSTRACT: For use with tape-recording equipment preferably using a cassette which has a pair of reels and a magnetic tape, the forward direction of movement of the tape being the record direction and the reverse direction being the rewind or playback direction, the apparatus including electric actuators which pull in and lock the tape-recording apparatus in either the record of the playback mode, the position being held without the continued application of electrical power to the electric actuators, and further including a release electric actuator which unlatches the record and playback actuators, and an interlock system preventing actuation of both modes of operation.

Nelson H. Patton, Jr.
INVENTOR

BY Donald Gunn
ATTORNEY

Nelson H. Patton, Jr.
INVENTOR

BY Donald Gunn

ATTORNEY

SWITCHING APPARATUS FOR CASSETTE TAPE-RECORDING EQUIPMENT INCORPORATING AN INTERLOCK SYSTEM

SUMMARY OF PROBLEM AND SOLUTION

The present apparatus is cooperative with tape-recording equipment, typically a cassette-recording apparatus in which the tape, the supply reel, and the takeup reel are all carried in a common cassette. In the use of the tape-recording equipment, it is desirable to actuate the equipment to record mode or to a playback or rewind mode. Quite clearly, the two modes of operation are mutually exclusive and the apparatus of the present invention provides a means for preventing actuation to both positions. That is to say, the present invention provides an interlock system which prevents actuation to both modes simultaneously.

The apparatus of the present invention is particularly useful in a portable recording machine. The apparatus conserves electrical power by maintaining the tape-recording equipment in the selected mode of operation without consuming power to maintain the selected mode. That is to say, once the equipment is placed in a selected operating mode, no further electrical power is required until the operating mode is released. Thus, a short pulse of energy is required for the electrical actuators to be described to place the equipment in the operating mode, and an equally short pulse of energy is required to release the equipment from the operating mode.

The apparatus of the present invention is thus summarized as providing first and second electric actuators which cooperate with a tape-recording apparatus having a conventional pinch roller and capstan arrangement for placing data on magnetic tape moving past a recording head. In the preferred embodiment, the tape is supplied in a cassette which includes a supply and takeup reel. The first and second actuators pull the respective components of the tape-recording equipment into the operative positions for either the record or playback modes of operation. The apparatus includes a latch cooperative with each of said electric actuators for securing the equipment in the operating mode without the maintenance of continued electrical power. There is further an interlock system cooperative between both the first and second electric actuators which enables one to be energized to the exclusion of the other, the interlock system being bilateral in operation. That is to say, if the apparatus is in a selected mode, the other mode is locked out. The apparatus further includes a release mechanism which is connected to both the first and second electric actuators to release the latches associated therewith. The mechanism releases both, the operation being effected simultaneously. All operations of the electric actuators are accomplished with the pulse of current flow to conserve battery power.

While the foregoing has been directed to the preferred embodiment of the present invention, the following specification will describe the preferred embodiment in conjunction with the associated drawings, which are:

FIG. 1 is a front view of the tape recorder apparatus showing the path of the tape, omitting the cassette housing, and illustrating the recording and off positions of the pinch roller with respect to the capstan;

FIG. 2 is the opposite side of the apparatus shown in FIG. 1, illustrating the electric actuators of the present invention for moving the tape-recording apparatus to either the record or rewind positions, and further illustrating the interlock of the present invention, and further illustrating the means for releasing the recording apparatus from the selected mode and returning it to the "off" position;

Figure 1:
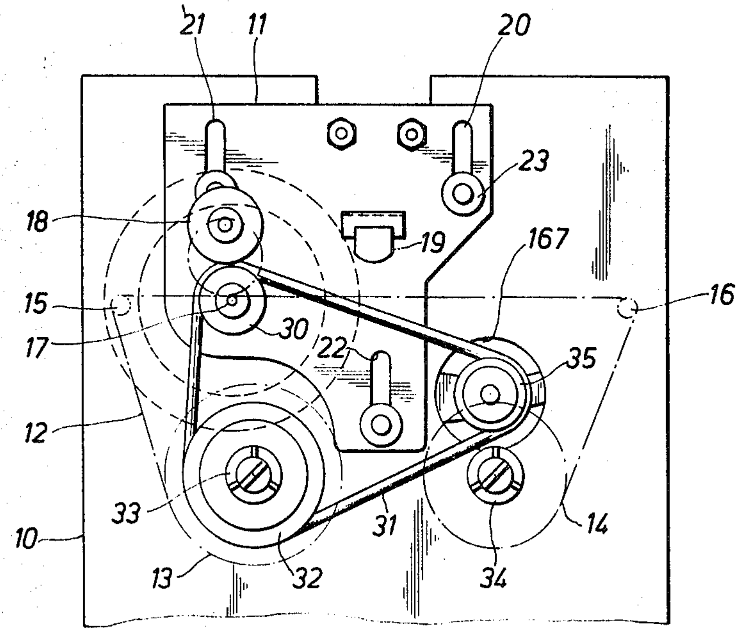

Attention is first directed to FIG. 1 of the drawings, which illustrates a mounting plate 10 on which the tape apparatus is received. The mounting plate 10 supports a slide plate 11. The numeral 12 indicates the path of movement of the tape from a supply reel 14 to a takeup reel 13. In the drawings, the housing or case of the cassette has been omitted for sake of clarification of the drawings. The tape 12 travels past a post 16 toward an additional post 15, which path of movement places it in position for cooperation with a drive capstan 17 which is positioned adjacent the tape 12 and opposite a pinch roller 18. Preferably, the capstan is a smoothly polished metal shaft while the pinch roller is substantially larger and coated with a resilient material.

As shown by the dotted line representation of FIG. 1, the pinch roller has two positions, one quite remote from the recording tape 12 and the other immediately adjacent thereto and opposite the capstan 17. When the pinch roller 18 is withdrawn from contact with the tape, the tape 12 is not moved and hence, no recording is accomplished. When the capstan drives the tape 12 backed by the pinch roller, the equipment is in an operative position for recording. The operative and interlock means of the present invention will be related to several positions of the recording equipment as will be set forth hereinafter in greater detail.

The slide plate carries the recording and playback head 19 which is spaced from the tape 12 in the off position of FIG. 1. The tape head 19 is contacted against the tape 12 to effect the recording or playback, as the case may be, at the proper time. The slide plate 11 includes three slots 20, 21 and 22, which are parallel with one another to guide its movement in response to the equipment of the present invention. The slide plate 11 is joined to the mounting plate 10 by a plurality of upstanding mounting posts which extend through the slots 20, 21 and 22, and which are equipped with an enlarged head as best illustrated at 23. The mounting post and enlarged head is duplicated at each of the three slots, Hence, the slide plate has two positions, the uppermost position of FIG. 1, which is the off position, and the "record " position wherein the mounting post 23 is moved to the upper end of the slot 20, a position at which the pinch roller 18 is engaged with the tape and the magnetic head 19 is positioned adjacent to the tape.

Figure 2:
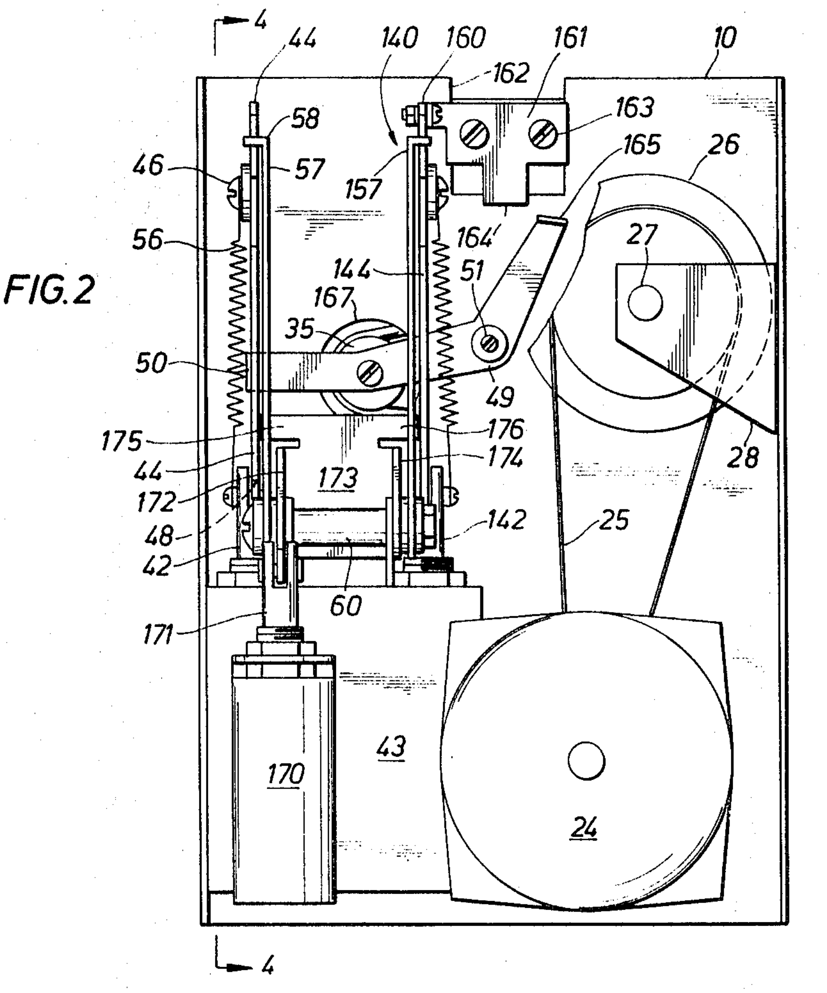

Attention is momentarily directed to FIG. 2, which shows the bottom side of the mounting plate 10. The numeral 24 indicates a drive motor which is connected by a suitable rubber drive belt or band 25 with a substantial fly wheel 26 mounted on a centrally located shaft 27. The shaft 27 is supported by a mounting bracket 28 on the lower side of the mounting plate 10. The shaft 27 is common with the capstan 17 shown in FIG. 1, and rotates the capstan 17 at all times when the apparatus is energized. The slide plate 11 is slotted to permit its movement relative to the capstan 17 which is fixed with respect to the mounting plate 10. The slot is not shown in the drawings inasmuch as it is beneath the pinch roller 18 and the pulley system to be described for moving the tape 12.

It was noted above that the shaft 27 is common with the capstan 17 which is on the top side of the mounting pulley which is engaged with a flexible rubber band 31 which fits within a groove on the periphery of the drive pulley 30. The rubber band 31 rotates a pulley 32 which supports and engages through a slip clutch as upstanding rotatable post 33 which fits within a toothed hub on which the takeup reel 13 is mounted in a conventional tape cartridge cassette. Again, it should be noted that the cassette housing has been omitted for sake of clarity. A similar rotatable upstanding post is located at 34 central of the spool 14, and provides an axis of rotation for that reel. Again, the post 34 extends into the cassette cartridge proper. The drive band 31 extends about an additional pulley 35. In the rewind position, the drive shaft bears against the supply reel 14 and rotates that reel to rewind the tape 12 as it travels from the reel 13 back through the recording equipment to the supply reel 14. As will be understood, the diameter of the reel 14 is fixed but the tape speed increases near the end of the tape. Positive drive for the tape in the record direction is provided by the capstan 17, whereas the slip clutch at the takeup reel 13 accommodates slippage between the reel and the drive mechanism. This maintains adequate tension on the magnetic tape 12 as it traverses first the recording head and then the capstan.

The rewind of the tape 12 is accomplished in the following manner. The slide plate 11 is left in the illustrated position of FIG. 1, and hence, the pinch roller 18 is kept remote from the tape and does not cooperate with the capstan 17 to provide a positive drive. The motor 24 is driven in the same direction and the drive belt 31 rotates in a counterclockwise direction as shown in FIG. 1. This draws the tape 12 back onto the supply reel 14 when the rewind pulley 35 is brought into contact with the takeup reel at 14. Actually, the belt 31 serves as a sort of bumper against the hub or reel 14 to increase the frictional engagement.

Figure 4:
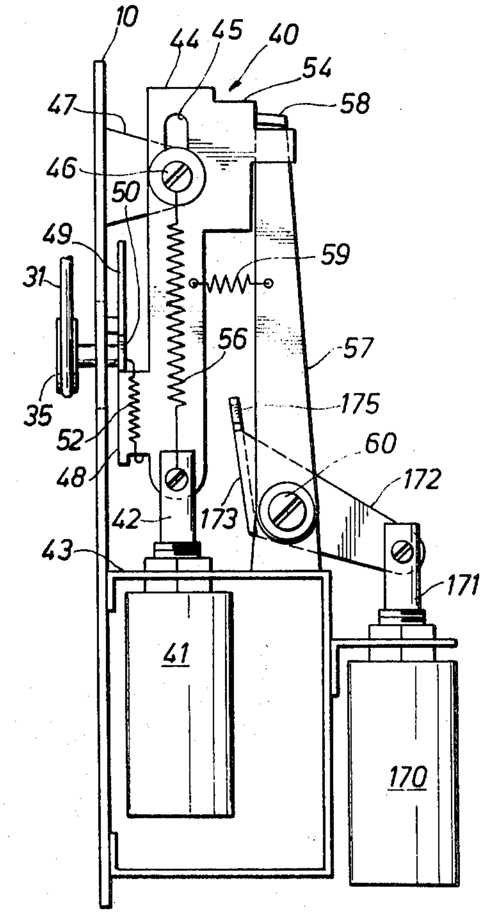
FIG. 4 is a sectional view taken along the line 4—4 of FIG. 2 illustrating the off position of the apparatus placing the recording equipment in the rewind position; and, FIG. 5 is a view similar to FIG. 4 illustrating the equipment in the actuated position and showing operation of the latch means which holds the equipment in the playback position indefinitely.

To this juncture, operation of the tape-recording equipment in the off position, the record position, and the "rewind" position has been generally described. The apparatus of the present invention is cooperative with the preferred version of the support structure. It will be understood in the description hereinafter that other arrangements for tape recording and rewind may be likewise used. Attention is now directed to the improved means of the present invention, beginning with FIG. 4. In FIG. 4, the numeral 40 indicates the rewind apparatus. By rewind apparatus, reference is made to the apparatus which places the tape-recording equipment in the rewind position or mode, and holds it in that mode of operation until released.

In FIG. 4, the mounting plate 10 supports the electrical actuator 41 which is, in the preferred embodiment, a solenoid. The solenoid 41 has a movable shaft 42. The solenoid 41 is mounted on a support bracket 43 through the use of locknuts on a threaded collar on the solenoid 41. The shaft 42 is pivotally mounted to a traveling plate 44 having the configurations shown in FIG. 4. The opposite end of the traveling plate 44 includes a slot 45 which guides movement of the plate 44 by a screw 46 threaded into a mounting bracket 47. When the solenoid 41 is actuated by conventional means to pull the shaft 42 toward itself, the traveling plate 44 of FIG. 4 moves to the position of FIG. 5. There, it will be seen that the screw 46 is moved relative to the slot 45 and serves the purpose of guiding the traveling plate in its reciprocating movement. The traveling plate 44 has only two alternative positions as will be described in detail hereinafter.

The traveling plate has a reciprocating movement which is particularly useful in placing the apparatus in the rewind position. One side of the traveling plate 44 incorporates a perpendicular tab 48 which works against a lever 49. The lever 49 is more clearly shown in FIG. 2 as including one end at 50 which is immediately adjacent the movable tab 48 carried on the traveling plate 44. Referring to FIG. 2, operation of the solenoid moves the traveling plate 44 downwardly in the drawing to pull the end 50 of the lever 49 downwardly by the operation of the spring 52. The lever 49 is pushed up by the tab 48. The lever 49 is mounted on a pivot screw 51 for rotative movement on operation of the solenoid 41. More will be noted concerning the lever 49 and the related apparatus hereinafter.

Figure 5:
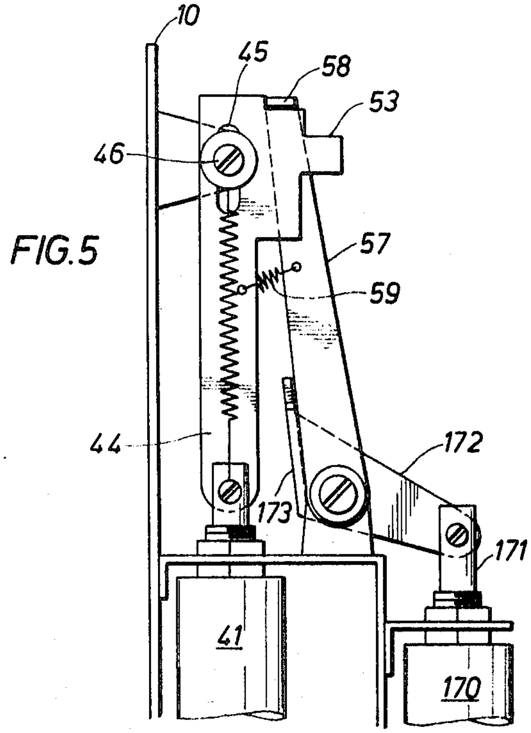

The traveling plate 44 further includes a first locking edge 53 shown in FIG. 5, and a second locking edge 54 shown in FIG. 4. The locking edges 53 and 54 are spaced one from the other a distance approximating the amount of reciprocating movement of the traveling plate 44 when the solenoid 41 is actuated. Thus, should the solenoid move the plate 44 approximately one-quarter inch, the locking edges 53 and 54 are approximately one-quarter inch apart. It should be noted that they slope slightly for ease of engagement with a latch mechanism to be described hereinafter. A return spring 56 is connected to the solenoid shaft 42 and to the guide screw 46 protruding from the slot 45 of the traveling plate. The spring draws the traveling plate back to the original or off position of FIG. 4. It is shown extended or elongated in FIG. 5, which illustrates the traveling plate 44 in the lowermost position which it may assume. The return spring 56 works against the solenoid 41 and is set by actuation of the solenoid. The traveling plate is released for movement to its original or off position, the position of FIG. 4, by a means to be described hereinafter.

The numeral 57 indicates a latch arm which incorporates a bent latch tab 58 on its outer end. In FIG. 4, the latch tab 58 is shown engaged with the latching edge 53 of the traveling plate. In FIG. 5, it is shown engaged with the latch edge 54. The latch tab 58 is held in position of FIG. 5 by a spring 59 which is connected with the traveling plate 44. The latch arm 57 is rotatable about a pivot point 60 which is a common axle for several components of the mechanism as will be described. Briefly, the latch 57 secures the traveling plate 44 in the down position, or in the rewind position, best illustrated in FIG. 5. It will be observed that the latch tab 58 carried on the outer end is engaged with the steps formed on the end of the traveling plate 44 to attain the indicated locking position. More particularly, the up off-position of FIG. 4 is the normal or unoperative position of the apparatus. In this position the latch 57 likewise has a certain engaged relationship best illustrated in the drawings with the traveling plate 44.

As shown in FIG. 2, there is a second mechanism broadly indicated by the numeral 140 which places the tape-recording apparatus in the record position. The apparatus 140 is similar to the means 40 described for the rewind position. Similar components are given reference numerals increased by 100. The principal differences in the means 140 in comparison with the means 40 is the reversal of the lever 157 to an inboard position of the traveling plate 144 as best shown in FIG. 2. It will be noted that the arrangement of the components in FIG. 2 is symmetrical for the reasons to be set forth hereinafter. Additionally, the traveling plate 144 does not include a downwardly protruding tab 48 of the traveling plate 44, but rather includes a bolted connection 160 best shown in FIGS. 2 and 3. The far end or tip of the traveling plate 144 includes a protruding eyelet tab which is bolted to an upstanding eyelet carried on the corner or on the edge of a locking plate 161.

Figure 3:
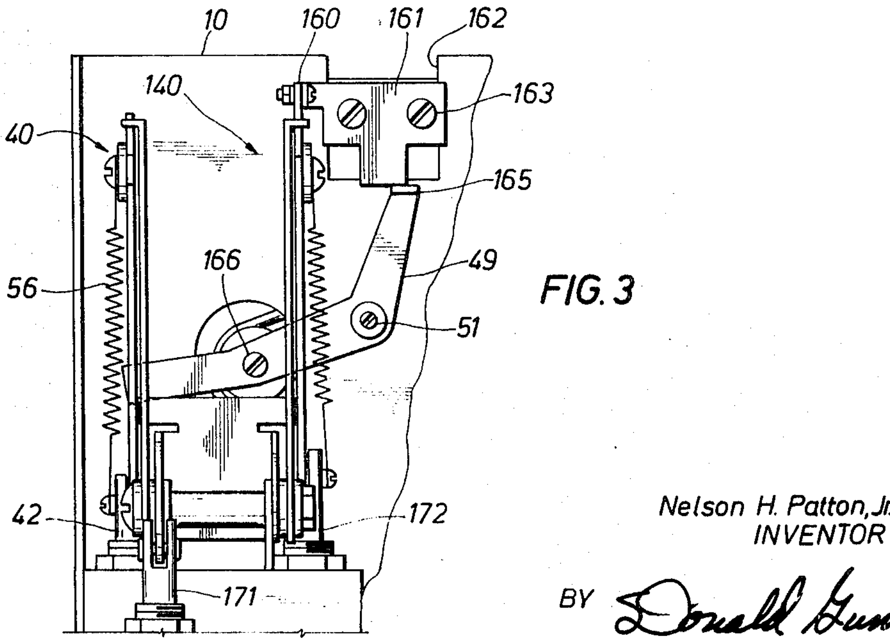
FIG. 3 is a view similar to FIG. 2 showing a portion of the apparatus thereof with the equipment in the rewind position and showing operation of the interlock apparatus preventing possible actuation of the record mode.

The locking plate 161 is a T-shaped plate having the upstanding eyelet which is joined with the traveling plate 144. As shown in FIGS. 2 and 3, the connection is made with a nut and bolt. More particularly, the locking plate 161 is T-shaped and travels immediately adjacent to a notch or cutout 162 formed in the mounting plate 10 of the tape-recording equipment. The notch or cutout 162 is an opening in the mounting plate of sufficient length to permit connection by means of nuts and bolts 163 to the sliding plate 11. That is to say, the locking plate is connected to the sliding plate 11 with the two plates on opposite sides of the mounting plate 10. The bolts 163 extend through the mounting plate to permit the locking plate and the sliding plate to move as a unit on both sides of the mounting plate 10.

The locking plate 161 includes a locking tab 164 which is positioned immediately adjacent to the lever 49 as shown in FIG. 2. The tab 164 is positioned with respect to the lever 49 in one of two positions, depending on whether the means 40 or the means 140 is first operated. The tab 164 has a bottom locking edge and a right-hand locking edge as will be set forth.

The lever 49, previously introduced, includes an upstanding tab 165. The tab 165 is adapted to abut the tab 164 on the locking plate 161. The abutting relationship is achieved on the lower edge, or the right-hand edge of the tab 164 as viewed in FIG. 2. In FIG. 2, both the mechanisms 40 and 140 are shown at their respective off positions. The spacing or gap between the tabs 164 and 165 is maintained so long as both mechanisms are in the off position. As shown in FIG. 3, the tab 165 has been actuated or moved with respect to the locking plate 161 and assumes a locking position, forbidding movement of the locking plate 161, and consequently, the traveling plate 11 shown in FIG. 1. The lever 49 carries a mounting shaft or axle 166 which is common with the rewind pulley 35 best shown in FIG. 1. As viewed in FIG. 1, a cutout 167 is formed in the mounting plate 10 to permit the lever 49 on the back side of the mounting plate to support and suspend the pulley 35 at the proper elevation to be engaged with the flexible drive belt 31. As shown in FIG. 2, the back side of the pulley 35 can be viewed through the cutout 167. Thus, movement of the lever accomplishes movement of the pulley 35 to an engaged position. The movement of the pulley 35 is, in truth, an arcuate movement, although it approximates movement in an upward and downward line as viewed in FIG. 1. The principal goal is to move the wind pulley 35 from a nonoperative position into a rewind position in conjunction with the reel 14.

As an aside, the components of the actuator means 40 and the components of the actuator means 140, to the extent that they are identical, are indicated by the same numerals increased by a prefix of 100. The similar or identical components are thus believed fully described wherein the operation of the means 40 and 140 are both understood. The basic points of difference are that the actuator means 40 moves the lever 49 while the actuator means 140 moves the traveling plate 11.

Attention is next directed to FIG. 2 of the drawings which illustrates the centerline symmetry of the means 40 and 140. Moreover, it will be noted that both the means 40 and 140 are pivotal about a common axis 60. In addition, a solenoid 170 is mounted on the top side of the mounting bracket 43 and includes a pushrod 171. The pushrod 171 is connected with a rotatable plate 172 best shown in FIGS. 4 and 5. The rotatable plate 172 is rotatable about the common pivot 60 as shown in FIG. 2. The rotatable plate 172 is yoked to the shaft 171 which permits its relative rotative movement. The rotatable plate 172 is perpendicular to a platelike member 173 which is mounted to and connected with the common shaft 60 for rotative movement with movement of the plate 172. As shown in FIG. 2, the plate 173 includes the upstanding left-hand plate 172 and a symmetrical right-hand plate 174. Both the plates 172 and 174 are supported on the shaft 60.

The plate 173 at its upper edge as shown in FIG. 2 includes outwardly protruding return tabs 175 and 176 respectively. The tabs 175 and 176 are identical in structure and in function. The tab 175 is immediately beneath the latch 57 as shown in FIG. 2, while the tab 176 extends just below the latch 157 in a symmetrical manner. It will be noted in viewing FIG. 2 that the release tabs 175 and 176 jointly and simultaneously both pull up on the latches 57 and 157. The upward movement is in response to operation of the solenoid 170 which rotates the plate 173 with respect to the common pivot point 60 shared by the actuator means 40 and the actuator means 140. The latches 57 and 157 are lifted slightly upward to allow the return springs 56 and 156 to move the traveling plates 44 and 144 upwardly in FIG. 2. More specifically, the bent members 58 and 158 carried at the outer end and engaged with the latching edges best shown in FIGS. 4 and 5 are moved from the second latching edge to the first latching edge. As viewed in FIGS. 4 and 5, the latch 57 is rotated slightly clockwise from the position of FIG. 5 to disengage the latching edge 54. The clockwise movement frees the traveling plate 44 to move upwardly as shown in FIG. 4, whereupon the solenoid 170 may be released and the return spring 59 functions to maintain the latch 57 in the position of FIG. 4.

In summation, the solenoid 170 and the cooperative apparatus described forms what may be described as a jointly operative release means or mechanism which cooperates with both actuators 40 and 140 to place the tape mechanism in the off position. It will be understood and appreciated that only a short application of current to the solenoid 170 is required to achieve the results above described. The lever 57 needs to be lifted only for a short interval of time to permit the traveling plate to move to the position of FIG. 4.

It is believed that operation of the actuator means 40 and 140 has been fairly completely explained to this juncture.

Both have been described in conjunction with the lever 49 and the traveling plate 11 which are moved by the respective means 40 and 140. However, strong emphasis should be placed on the interlock means cooperative between the means 40 and 140. As shown in FIG. 2, the locking plate 161 assumes a particular abutting relationship to the lever 49 to prevent simultaneous operation of the record and rewind mechanisms. Even if both solenoids for both mechanisms were simultaneously actuated, one would be energized first and the second to be energized would be locked out of the energized or "on" position through the use of the interlock means best shown in FIGS. 2 and 3.

As will be recalled, FIG. 3 is illustrative of this fact. In FIG. 3, the actuator means at 40 is in the down position which is achieved after the application by conventional means of a short pulse of current to its solenoid. Moreover, the lever 49 has been rotated counterclockwise about its pivot point 51. The upstanding tab 165 carried on the end of the lever 49 has been moved to a point immediately below the locking plate 161, the relative position best being noted in comparison of FIG. 2 and FIG. 3. In FIG. 3, the interlock tab 165 is almost at the centerline position with respect to the locking plate 161. In FIG. 2, it is quite remote and to the right, and not in position to abut the lower face of the tab 164. This locks the traveling plate 11 in the illustrated position of FIG. 1, and denies movement downwardly to the record position. So long as the means 40 remains in the actuated position of FIG. 3, the traveling plate 11 of FIG. 1 is not free, and indeed, its movement is forbidden.

The interlock means best illustrated in FIG. 3 functions bilaterally. If the locking plate 161 moves downwardly as viewed in FIG. 2, then the lever 49 is prevented from rotating counterclockwise about its pivot point 51. This is achieved when the traveling plate 11 is moved to the record position of FIG. 1. By the same token, the interlock means as shown in FIG. 3 functions to deny rotation to the lever 49 if it were to be actuated. Hence, it will be understood that the interlock means operates in a bilateral manner with the tab 165 striking or contacting the tab 164 on its lower face or on the right-hand face, depending on which of the two is first moved.

Operation of the present invention will now be summarized. Briefly, the tape-recording equipment includes an off position, best illustrated in FIG. 1, and likewise has a record position in which the pinch roller 18 and the capstan 17 are brought into an operative relationship with the magnetic tape 12. This position is accompanied by movement of the traveling plate 11.

On the other hand, the rewind position of the equipment is achieved through movement of the pulley 35 while the pinch roller 18 remains remote from the tape 12. As mentioned in the beginning of the present description, it is highly undesirable to permit the tape-recording equipment to be operated to both the record and rewind positions simultaneously. Such operator errors can, and do frequently occur. The present invention provides an interlock means preventing such operation. The present invention further utilizes the actuator means 40 and 140 previously described to set the tape-recording equipment in either the rewind or record positions, respectively. In either case, the selected operative position is achieved with a short application of current to the selected solenoid. The solenoid current need not be maintained to continue a holding action to keep the apparatus in the operative position. Thus, a short pulse of current will turn the equipment on, to the rewind, or record positions, and the on position is maintained indefinitely.

When the operator desires to end the recording or rewind cycle, the present invention likewise includes a release means which unlatches the latched actuator means 40 or 140. In other words, the rewind or record position is released and the equipment is turned off by conventional means. The release means includes a solenoid which is operated only for a fraction of a second. This, again, is a power-conserving means particularly adapted for use in portable or battery operated equipment. Moreover, the release means is only called into action at the end of the operative cycle. Thus, the application of a short pulse of current will achieve the desired release. It will be noted that the release means is operative with both the electric actuators for the rewind and for the record positions. Both are released, although it will be understood that only one is operative at a given time through operation of the interlock means best shown in FIG. 3. The interlock means is summarized as a bilateral interlocking means permitting actuation of the means 40 or the means 140, wherein the first to be actuated locks out the second.

The foregoing is directed to the preferred embodiment of the present invention. Changes and variations too numerous to detail here may be incorporated with the several structures described above. Moreover, the description has assumed the use of the preferred or currently popular form of the cassette cartridge which carries the magnetic tape between two reels and which cartridge is insertable or removable as a unit in the recording equipment. In times to come, it might occur that the cassette may change in size, shape or operative features, or indeed, may be substantially modified or eliminated. In any event, the apparatus of the present invention is cooperative with the cassette as shown in the preferred embodiment, and other tape-handling arrangements as might be developed.

While the foregoing is directed to the preferred embodiment, and several variations or alterations are included therewith, the scope of the present disclosure is determined by the claims which are appended hereto, wherein the various terms and definitions developed in the written specification are extended to the claims.

What is claimed is:

1. Apparatus adapted for transporting recording media and comprising:

a. media-transporting means selectively operable for shifting recording means in alternate directions;

b. first and second selector means respectively adapted for independent movement between a normal position and an active position for operating said media-transporting means in accordance with which of said first and second selector means are moved;

c. first latching means operable upon movement of either one of said first and second selector means to its said active position for releasably retaining the other of said selector means in its said inactive position;

d. second latching means operable upon movement of either one of said first and second selector means to its said active position for releasably retaining said one selector means in its said active position;

e. release means operatively coupled to said second latching means for selectively releasing said one selector means for movement back to its said inactive position;

f. first and second electrical actuator means respectively coupled to said first and second selector means and selectively operable for moving said selector means to their respective said active position; and, g. first and second means normally urging said first and second means to their respective inactive positions.

2. The media-transporting apparatus of claim 1 further including:

a. third electrical actuator means coupled to said release means and selectively operable for moving said second latching means to release said one selector means to its said inactive position.

3. Apparatus adapted for transporting recording media between first and second reels and comprising;

a. first and second spindles respectively adapted for supporting a reel carrying a recording medium;

b. means including a motor adapted for operatively driving either of said spindles in a selected rotative direction;

c. first means selectively operable for coupling said motor to said first spindle and including a first actuator adapted for movement between an inactive position and an active position;

d. second means selectively operable for coupling said motor to said second spindle and including a second actuator adapted for movement between an inactive position and an active position;

e. latching means operatively arranged between said first and second actuators and responsive to movement of either one of said actuators toward its said active position for releasably retaining the other of said actuators in its said inactive position and for releasably retaining said one actuator in its said active position; and, f. third means selectively operable for uncoupling said motor from said first and second spindles and including a third actuator coupled to said latching means and adapted for releasing said latching means from said first and second actuators.

4. The apparatus of claim 3 wherein said first means include:

a. a first electrical apparatus coupled to said first actuator and operable only for moving said first actuator to its said active position, and, b. said second means include a second electrical apparatus coupled to said second actuator and operable only for moving said second actuator to its said active position.

5. The apparatus of claim 4 wherein said third means include:

a. a third electrical apparatus coupled to said third actuator and operable only for moving said third actuator to release said latching means from said first and second actuators.

6. The apparatus of claim 4 wherein said latching means include:

a. a stop member operatively arranged between said first and second actuators and adapted for movement between a neutral position and first and second positions respectively blocking movements of said first and second actuators away from their respective inactive positions, means on said first actuator adapted for engagement with said stop member to move said stop member from its said neutral position to its said second position upon movement of said first actuator to its said active position, and means on said second actuator adapted for engagement with said stop member to move said stop member from its said neutral position to its said first position upon movement of said second actuator to its said active position.

7. The apparatus of claim 6 wherein said latching means include:

a. first and second latch members respectively adapted for movement into engagement with said first and second actuators for selectively retaining said first and second actuators upon their movement to their respective active positions; and, b. said third means include a third electrical apparatus coupled to said third actuator and operable only for moving said third actuator to release said latch members from said first and second actuators.

8. A tape recorder comprising:

a. first and second reel spindles respectively adapted for supporting a reel carrying a tape;

b. driving means including a motor and adapted for movement from an inactive position either to a first active position for operatively driving said first reel spindle or to a second active position for operatively driving said second reel spindle;

c. first electrical means operatively coupled to said driving means and adapted for selectively moving said driving means from its said inactive position to either of its two said active positions;

c. first latch means operable upon movement of said driving means toward one of its said active positions for releasably blocking movement of said driving means toward the other of its said active positions;

d. second latch means operable upon movement of said driving means into one of its said active positions for releasably retaining said driving means in that active position; and, e. second electrical means selectively operable for releasing said first and second latch means and returning said driver means to its said inactive position.

9. The recorder of claim 8 wherein said first latch means include a stop member adapted for selective movement between first and second positions respectively blocking movement of said driving means to its said two active positions, first and second means on said driving means and respectively adapted for moving said stop member to one of its said two active positions upon movement of said driving means to the other of its said two active positions;

a. said second latch means include first and second independently operable latch members respectively adapted for retaining said driving means in one or the other of its said two active positions; and, b. said second electrical means are coupled to said first and second latch members to selectively retract said latch members for returning of said driving means to its said inactive position.